United States Patent
Lee et al.

(10) Patent No.: US 9,965,822 B2
(45) Date of Patent: May 8, 2018

(54) ELECTRONIC DEVICE AND METHOD FOR PROCESSING A PLURALITY OF IMAGE PIECES

(71) Applicant: Samsung Electronics Co., Ltd., Suwon-si, Gyeonggi-do (KR)

(72) Inventors: Woo-Yong Lee, Hwaseong-si (KR); Hyeon-Jae Bak, Yongin-si (KR); Kwang-Kyu Park, Suwon-si (KR); Dong-Kook Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 14/622,073

(22) Filed: Feb. 13, 2015

(65) Prior Publication Data

US 2015/0242987 A1 Aug. 27, 2015

(30) Foreign Application Priority Data

Feb. 21, 2014 (KR) .................. 10-2014-0020887

(51) Int. Cl.
 *G06T 1/20* (2006.01)
(52) U.S. Cl.
 CPC ..................... *G06T 1/20* (2013.01)
(58) Field of Classification Search
 None
 See application file for complete search history.

(56) References Cited

U.S. PATENT DOCUMENTS

| 6,570,571 | B1 * | 5/2003 | Morozumi ............. G06F 9/505 345/505 |
| 8,387,033 | B2 * | 2/2013 | Gordy ..................... G06F 8/456 717/149 |
| 2009/0141807 | A1 * | 6/2009 | Krottendorfer ...... H04N 19/172 375/240.25 |
| 2010/0128801 | A1 * | 5/2010 | Hashimoto ...... H04N 19/00933 375/240.25 |
| 2011/0279462 | A1 | 11/2011 | Bakalash et al. |
| 2012/0200580 | A1 * | 8/2012 | Gnanasambandam ... G06T 1/20 345/505 |
| 2014/0098220 | A1 * | 4/2014 | Nunnink ................ H04N 5/232 348/135 |
| 2014/0168700 | A1 * | 6/2014 | Araya ..................... G06F 3/124 358/1.15 |

FOREIGN PATENT DOCUMENTS

| JP | 2007-512613 A | 5/2007 |
| KR | 10-2010-0032778 A | 3/2010 |

* cited by examiner

*Primary Examiner* — Xin Sheng
(74) *Attorney, Agent, or Firm* — Jefferson IP Law, LLP (57) ABSTRACT

An image processing method and electronic device are provided. The image processing method includes receiving an instruction to process an input image, determining at least one image processing unit to be used to execute the instruction based on a state of an electronic device, dividing the input image and distributing the divided input image to the determined at least one image processing unit, and processing the divided image using the at least one image processing unit and combining the processed divided image.

17 Claims, 5 Drawing Sheets

| STATE | INSTRUCTION | PROCESSING RATE OF IMAGE PROCESSING UNIT (Hz) | | | | | |
|---|---|---|---|---|---|---|---|
| | | FIRST UNIT | SECOND UNIT | THIRD UNIT | FOURTH UNIT | FIFTH UNIT | ⋮ |
| FIRST STATE | FIRST INSTRUCTION | 500 | 300 | 400 | 100 | 200 | ⋮ |
| | SECOND INSTRUCTION | 200 | 1000 | 600 | 200 | 100 | ⋮ |
| | THIRD INSTRUCTION | 300 | 100 | 200 | 1000 | 300 | ⋮ |
| SECOND STATE | FIRST INSTRUCTION | 100 | 500 | 300 | 200 | 100 | ⋮ |
| | THIRD INSTRUCTION | 1000 | 800 | 1000 | 300 | 500 | ⋮ |
| | THIRD INSTRUCTION | 200 | 150 | 400 | 500 | 200 | ⋮ |

ELECTRONIC DEVICE AND METHOD FOR PROCESSING A PLURALITY OF IMAGE PIECES

CROSS-REFERENCE TO RELATED APPLICATION(S)

This application claims the benefit under 35 U.S.C. § 119(a) of a Korean patent application filed on Feb. 21, 2014 in the Korean Intellectual Property Office and assigned Serial number 10-2014-0020887, the entire disclosure of which is incorporated hereby incorporated by reference.

TECHNICAL FIELD

The present disclosure relates to an electronic device. More particularly, the present disclosure relate to image processing in an electronic device.

BACKGROUND

In general, image processing applies various effects on an image, applying the effects pixel by pixel or performing frequency conversion of the image and processing each frequency band.

To perform repetitive operations on lots of data as in image processing, an image processing apparatus performs parallel processing on images using one or more image processing units. The parallel processing on images refers to a method for having a host hardware unit provide the same instruction but assign different data to one or more parallel processing hardware units to execute the instruction.

A parallel processing method in a typical Personal Computer (PC) environment is different from parallel processing in mobile terminals. For example, in the parallel processing method in mobile environments, hardware acceleration parts of mobile terminals are different from each other depending on respective Application Processors (APs) and Graphic Processing Units (GPUs) of the mobile terminals.

Furthermore, a fluctuating state of the mobile terminal, such as battery status, clock, an amount of memory use, an extent of heating, etc., may affect parallel processing results.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure provide an image processing method and electronic device for performing different levels of parallel processing depending on types of mobile terminal.

In accordance with an aspect of the present disclosure, an image processing method is provided. The method includes receiving an instruction to process an input image, determining at least one image processing unit used to execute the instruction based on a state of an electronic device, dividing the input image and distribute the divided image to the at least one image processing unit, and processing the divided image using the at least one image processing unit and combining the processed divided image.

In accordance with another aspect of the present disclosure, an electronic device is provided. The electronic device includes an image processing module having at least one image processing unit configured to perform image processing, and a manager module configured to determine at least one image processing unit to be used to execute an instruction based on a state of an electronic device upon reception of the instruction to process an input image, to divide the input image and distribute the divided image to the determined at least one image processing unit, and to process the divided image using the at least one image processing unit and to combine the processed divided image.

Other aspects, advantages, and salient features of the disclosure will become apparent to those skilled in the art from the following detailed description, which, taken in conjunction with the annexed drawings, discloses various embodiments of the present disclosure

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For examples, "A or B" may include A, or include B, or include both A and B.

Ordinal numbers as herein used, such as "first", "second", etc., may modify various components of various embodiments, but do not limit those components. For example, these terms do not limit order and/or importance of corresponding elements, components, regions, layers and/or sections. These terms are only used to distinguish one element, component, region, layer or section from another region, layer or section. For example, a first user device and a second user device refers to two different user devices. Thus, a first element, component, region, layer or section discussed below could be termed a second element, component, region, layer or section without departing from the teachings of the embodiments of the present disclosure. When the term "connected" or "coupled" is used, a component may be directly connected or coupled to another component or may be indirectly connected or coupled to another component via another new component.

However, if a component is said to be "directly connected" or "directly coupled" to another component, it should be interpreted as literally as it says. The terminology used herein is for the purpose of describing particular embodiments only and is not intended to be limiting of the embodiments of the present disclosure. It is to be understood that the singular forms "a," "an," and "the" include plural references unless the context clearly dictates otherwise.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An electronic device according to various embodiments of the present disclosure may have a communication functionality. For example, the electronic device may include at least one of smart phones, tablet Personal Computers (PCs), mobile phones, video phones, e-book readers, desktop PCs, laptop PCs, netbook computers, Personal Digital Assistants (PDAs), Portable Multimedia Players (PMPs), MP3 players, mobile medical devices, cameras, and wearable devices (e.g., Head-Mounted Devices (HMDs), such as electronic glasses, electronic clothes, electronic bracelets, electronic necklaces, electronic appcessories, electronic tattoos, or smart watches).

In some embodiments, the electronic device may be a smart home appliance having a display functionality. The smart home appliance may include at least one of e.g., televisions, Digital Video Disc (DVD) players, audio systems, refrigerators, air conditioners, cleaning machines, ovens, microwaves, washing machines, air purifiers, set-top boxes, TV sets (e.g., Samsung HomeSync™, Apple TV™, or Google TV™), game consoles, electronic dictionaries, electronic keys, camcorders, and electronic albums.

In some embodiments, the electronic device may include at least one of a variety of medical equipment (e.g., Magnetic Resonance Angiography (MRA), Magnetic Resonance Imaging (MRI), Computed Tomography (CT), photographing device, ultrasonic device, etc.), navigation devices, Global Positioning System (GPS) receivers, Event Data Recorders (EDRs), Flight Data Recorders (FDRs), car infotainment devices, marine electronic devices (e.g., marine navigation systems, gyro-compass, etc.), avionics, security devices, car head units, industrial or home robots, banking agency's Automatic Teller Machines (ATMs), or Point of Sales (POSs) for shops.

In some embodiments, the electronic device may include at least one of furniture or building/part of a structure including a display functionality, electronic boards, electronic signature receiving devices, projectors, or various instrumental equipment (e.g., meters for water, electricity, gas, or radio waves). The electronic device in accordance with various embodiments of the present disclosure may be one or more combinations of the aforementioned devices. In addition, the electronic device in accordance with various embodiments of the present disclosure may be a flexible device. It will be obvious to a person of ordinary skill in the art that the electronic device is not limited to the aforementioned examples.

An electronic device in accordance with various embodiments of the present disclosure will now be described with reference to accompanying drawings. The term "user" as herein used may refer to a person who uses the electronic device or a device (e.g., an artificially intelligent device) that uses the electronic device.

Figure 1:
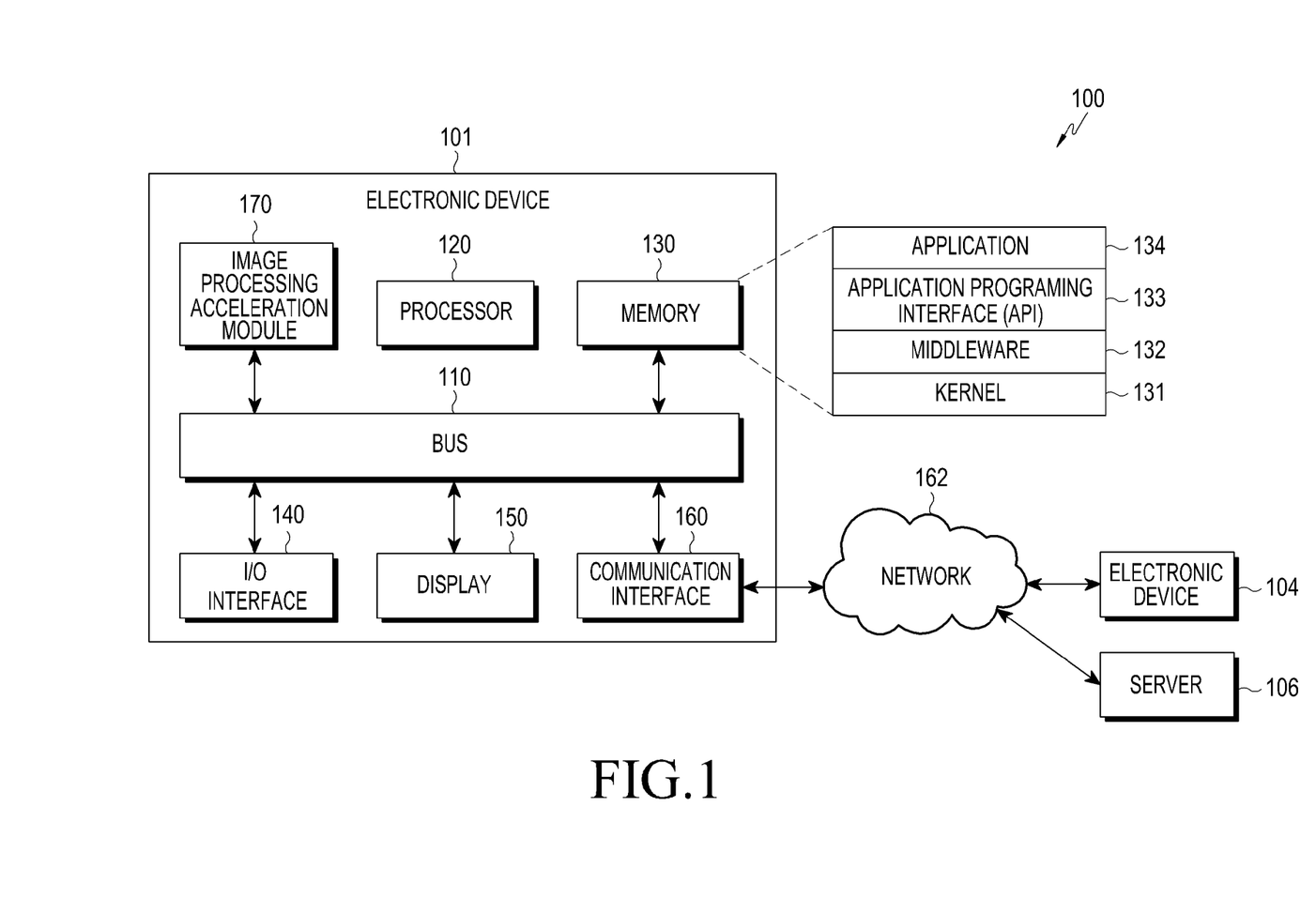
FIG. 1 illustrates a network environment including an electronic device, according to an embodiment of the present disclosure.

FIG. 1 illustrates a network environment including an electronic device according to an embodiment of the present disclosure.

Referring to FIG. 1, in the network environment 100 the electronic device 101 may include a bus 110, a processor 120, a memory 130, an Input/Output (I/O) interface 140, a display 150, a communication interface 160, and an image processing acceleration module 170.

The bus 110 may be a circuitry for interconnecting the enumerated components and delivering communications (e.g., control messages) among them.

The processor 120 may, for example, receive requests or commands from the enumerated components, the memory 130, the I/O interface 140, the display 150, the communication interface 160, or the image processing acceleration module 170 via the bus 110, interpret the requests or commands, and perform an operation or data processing according to the interpreted request or command.

The memory 130 may store requests, commands, or data received or generated from the enumerated components, e.g., the processor 120, the I/O interface 140, the display 150, the communication interface 160, or the image processing acceleration module 170. The memory 130 may include, for example, programming modules, such as kernel 131, middleware 132, Application Programming Interface (API) 133, application 134, or the like.

Each of the programming modules may be implemented in software, firmware, hardware, or two or more combinations thereof.

The kernel 131 may control or manage system resources (e.g., the bus 110, the processor 120, the memory 130 or the like) to be used to carry out an operation or function implemented by the other programming modules, e.g., the middleware 132, the API 133, or the application 134. Furthermore, the kernel 131 may provide an interface for the middleware 132, the API 133, or the application 134 to access respective components of the electronic device 101 to control or manage them.

The middleware 132 may act as intermediary for the API 133 or the application 134 to communicate data with the kernel 131. In addition, the middleware 132 may perform control operations (e.g., scheduling or load balancing) in response to a task request received from the application 134 by way of e.g., placing a high priority on at least one application included in the application 134 to use system resources (e.g., the bus 110, the processor 120, the memory 130 or the like) of the electronic device 101.

The API 133 is an interface for the application 134 to control a function provided from the kernel 131 or the middleware 132, and may include at least one interface or function (e.g., an instruction) for e.g., file control, window control, image processing, text control, etc.

In accordance with various embodiments, the application 134 may include a Short Message Service (SMS)/Multimedia Message Service (MMS) application, an email application, a calendar application, an alarm application, a healthcare application (e.g., an application for measuring quantity of motion or blood sugar), or environmental information application (e.g., an application for providing atmospheric pressure, humidity, or temperature). Additionally or alternatively, the application 134 may be an application involved in information exchange between the electronic device 101 and an external electronic device 104. The application involved in such information exchange may include e.g., a notification relay application for relaying particular information to the external electronic device 104 or a device management application for managing the external electronic device 104.

For example, the notification relay application may include a functionality for notifying the external electronic device 104 of notification information generated in any other application (e.g., the SMS/MMS application, the email application, the healthcare application, or the environmental information application) of the electronic device 101. Additionally or alternatively, the notification relay application may, for example, receive the notification information from the external electronic device 104 and provide the notification information to the user. The device manager application may manage (e.g., install, delete or update) a function (e.g., turning on/off the external electronic device 104 itself or a part of the external electronic device 104, or controlling display brightness of the external electronic device 104) with respect to part of the external electronic device 104 in communication with the electronic device 101, or a service (e.g., calling or messaging service) provided by the external electronic device 104 or an application running in the external electronic device 104.

In accordance with various embodiments of the present disclosure, the application 134 may include an application designated depending on an attribute of the electronic device 104, e.g., on a type of the electronic device 104. For example, in case the external electronic device 104 is an MP3 player, the application 134 may include an application related to music replay. Similarly, in case the external electronic device 104 is a mobile medical device, the application 134 may include an application related to healthcare. In accordance with an embodiment, the application 134 may include at least one of an application dedicated to the electronic device 101, and an application received from the external electronic device 104 or a server 106.

The I/O interface 140 may deliver instructions or data entered by the user through the I/O device (e.g., a sensor, a keyboard, or a touch screen) to the processor 120, the memory 130, the communication interface 160, or the image processing acceleration module 170 via the bus 110. For example, the I/O interface 140 may provide data for a user touch input through the touch screen to the processor 120. The I/O interface 140 may also output a command or data received from the processor 120, the memory 130, the communication interface 160, or the image processing acceleration module 170 via the bus 110 through the I/O device (e.g., a speaker or the display 150). For example, the I/O interface 140 may output sound data processed by the processor 120 to the user.

The display 150 may display various information (e.g., multimedia data or text data) for the user.

The communication interface 160 may connect communication between the electronic device 101 and the external electronic device 104 or the server 106. For example, the communication interface 160 may be connected to a network 162 through wired or wireless communication and may communicate with the external electronic device 104 or the server 106. The wireless communication may include at least one of Wi-Fi, BT, Near Field Communication (NFC), GPS, or cellular communication (e.g., LTE, LTE-A, CDMA, WCDMA, UMTS, Wibro or GSM). The wired communication may include at least one of e.g., Universal Serial Bus (USB), High Definition Multimedia Interface (HDMI), Recommended Standard (RS) 232 or Plain Old Telephone Service (POTS).

In accordance with an embodiment, the network 162 may be a telecommunications network. The telecommunications network may include at least one of computer network, Internet, or telephone network. In accordance with an embodiment, a protocol (e.g., a transport layer protocol, a data link layer protocol or a physical layer protocol) for communication between the electronic device 101 and the external device 104 or the server 106 may be supported by at least one of the application 134, the API 133, the middleware 132, the kernel 131, the communication interface 160, or the image processing acceleration module 170.

The image processing acceleration module 170 may handle at least a part of information obtained from other components (e.g., the processor 120, the memory 130, or the communication interface 160) and provide the results to the user in various ways. For example, when an instruction for image processing is entered, the image processing acceleration module 170 may control at least some functions of the electronic device 101 to have at least one image processing modules perform image processing in response to the instruction, independently, or using the processor 120. Further information regarding the image processing acceleration module 170 will be discussed in connection with FIG. 2.

Figure 2:
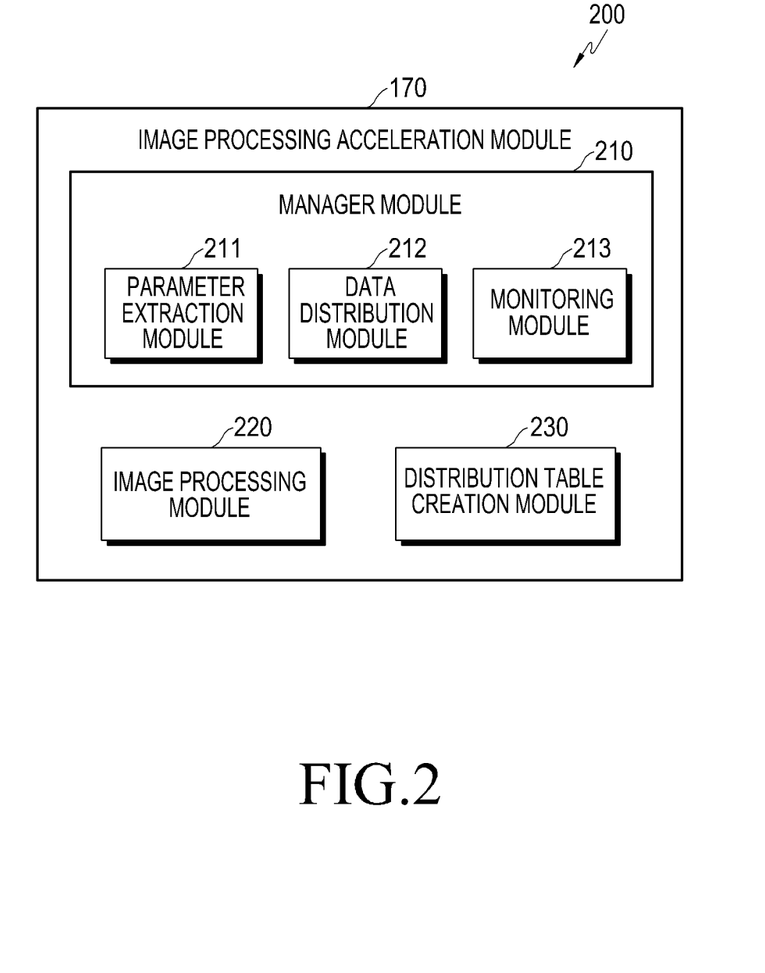
FIG. 2 is a block diagram of an image processing acceleration module of the electronic device according to an embodiment of the present disclosure.

FIG. 2 is a block diagram of the image processing acceleration module of the electronic device according to an embodiment of the present disclosure.

Referring to FIG. 2, in the block diagram 200, the image processing acceleration module 170 may include a manager module 210, an image processing module 220, and a distribution table creation module 230.

For example, the manager module 210 may extract image processing parameters to be used for executing an instruction entered to process an input image based on features and current states of the electronic device 101 from a pre-stored distribution table. The image processing parameters may be image processing capability information about image processing units to be used to execute a particular instruction based on features and current states of the electronic device 101. The distribution table may include at least a piece of image processing capability information for image processing units so as to execute at least one instruction based on various states of the electronic device 101.

In various embodiments of the present disclosure, states of the electronic device 101 refer to a variety of environments that affect processing capabilities of the image processing units, such as image data processing speeds, throughputs, etc. The states of the electronic device 101 may depend on environmental factors, such as an amount of remaining charge of the battery, clock, an amount of memory use, an extent of heating, etc. For example, as the amount of remaining charge of the battery decreases, different amounts of power are to be provided to respective image processing units and thus processing capabilities of the respective image processing units may be changed. Taking into account such processing capabilities, the manager module 210 may adjust amounts of data to be assigned to the respective image processing units and re-distribute data that has been assigned to an image processing unit whose processing capability gets degraded to another.

The manager module 210 may select at least one image processing unit in the image processing module 220 for processing images based on the extracted image processing parameters, and divide the input image and send the divided image to the selected at least one image processing unit. The at least one image processing unit included in the image processing module 220 refers to at least one unit for performing single processing or parallel processing on the input image in response to a particular instruction. The image processing unit may be a hardware architecture like an AP, CPU, GPU, etc., or a software architecture like C/C++, OpenCL, Neon, etc.

Upon completion of image processing by the at least one image processing unit, the manager module 210 may combine image-processed divided image and output the resultant image.

The manager module 210 may also monitor an image processing state of the at least one image processing unit, and re-distribute images to the respective image processing units according to the monitoring results.

In various embodiments, the manager module 210 may include a parameter extraction module 211, a data distribution module 212, and a monitoring module 213.

The parameter extraction module 211 may use the distribution table created by the distribution table creation module 230 to extract image processing parameters suitable for executing the instruction based on features and current states of the electronic device 101.

The data distribution module 212 may determine at least one image processing unit for processing the input image based on the extracted image processing parameters, and divide the input image and send the divided input image to the selected at least one image processing unit. If a single image processing unit is selected to perform single image processing on the input image, the data distribution module 212 may send the entire input image to the image processing unit. If a plurality of image processing units are selected to perform parallel image processing, the data distribution module 212 may distribute divided data to the plurality of image processing units.

In another embodiment, in a case that divided data is distributed to the plurality of image processing units, the data distribution module 212 may adjust amounts of the divided data for distribution based on respective processing capabilities of the image processing units. For example, in a case data is divided into 10 pieces to be distributed to three image processing units, the data distribution module 212 may distribute the 10 pieces of image data to the three image processing units in an order of having higher image processing capabilities.

The image processing capability of an image processing unit may be determined according to data processing speed, data throughput, etc., of the image processing unit. For example, the faster the data processing speed and the higher the data throughput, the higher the image processing capability of the corresponding image processing unit.

Furthermore, the data distribution module 212 may change an image processing unit to process data upon data re-distribution request received from the monitoring module 213 or adjust amounts of the data for the respective image processing units. The monitoring module 213 may determine whether data re-distribution is needed to process an image by monitoring respective image processing capability of the at least one image processing unit within the image processing module 220.

In an embodiment, the monitoring module 213 may monitor the respective image processing capability of the at least one image processing unit and accordingly re-distribute data for an image processing unit having degraded image processing capability to another image processing unit or re-distribute less amount of data to the image processing unit having the degraded processing capability.

For example, if a single image processing software architecture like C/C++ gets slower than a predetermined speed threshold while processing an input image, the monitoring module 211 may determine that data re-distribution is required. The monitoring module 211 may then send a data re-distribution request for image processing to the data distribution module 212.

The image processing module 220 includes at least one image processing unit for image processing. The image processing unit may be a hardware architecture like an AP, CPU, GPUs, etc., or a software architecture like C/C++, OpenCL, Neon, etc.

The distribution table creation module 230 may create and store a distribution table used to determine at least one image processing unit for performing image processing. The distribution table may include at least a piece of image processing capability information of image processing units to execute at least one instruction based on various states of the electronic device 101.

The distribution table creation module 230 may store the distribution table with default parameters about the image processing capability information of the at least one image processing unit that corresponds to at least one state of the electronic device 101.

The distribution table creation module 230 may create the distribution table that includes image processing capabilities corresponding to software or hardware architectures equipped in the electronic device 101 for executing instructions for image processing. The distribution table is used whenever image processing instructions are executed in the electronic device 101, thereby reducing an additional load.

In addition, the distribution table creation module 230 may periodically check the state of the electronic device 101, and create a new distribution table by updating the existing distribution table if the state meets a particular condition. The state of the electronic device 101 may depend on an amount of remaining charge of the battery, an extent of heating, an amount of memory use, etc., of the electronic device 101. For example, in a case the existing distribution table includes respective processing capabilities of image processing units for executing a particular instruction on condition of 100% battery, if the battery gets below 50%, the distribution creation module 230 may measure respective processing capabilities of image processing units in the current state and create a new distribution table by updating the existing distribution table with the measured processing capabilities.

With the newly created distribution table, the manager module 210 may distribute data taking into account the current state of the electronic device 101, i.e., if a processing capability of the CPU of the electronic device 101 gets degraded, the manager module 210 may distribute more data to the GPU or if the battery has low power, the manager module 210 may distribute less data to the GPU.

Further information regarding the distribution table will now be described with reference to FIG. 3.

Figure 3:
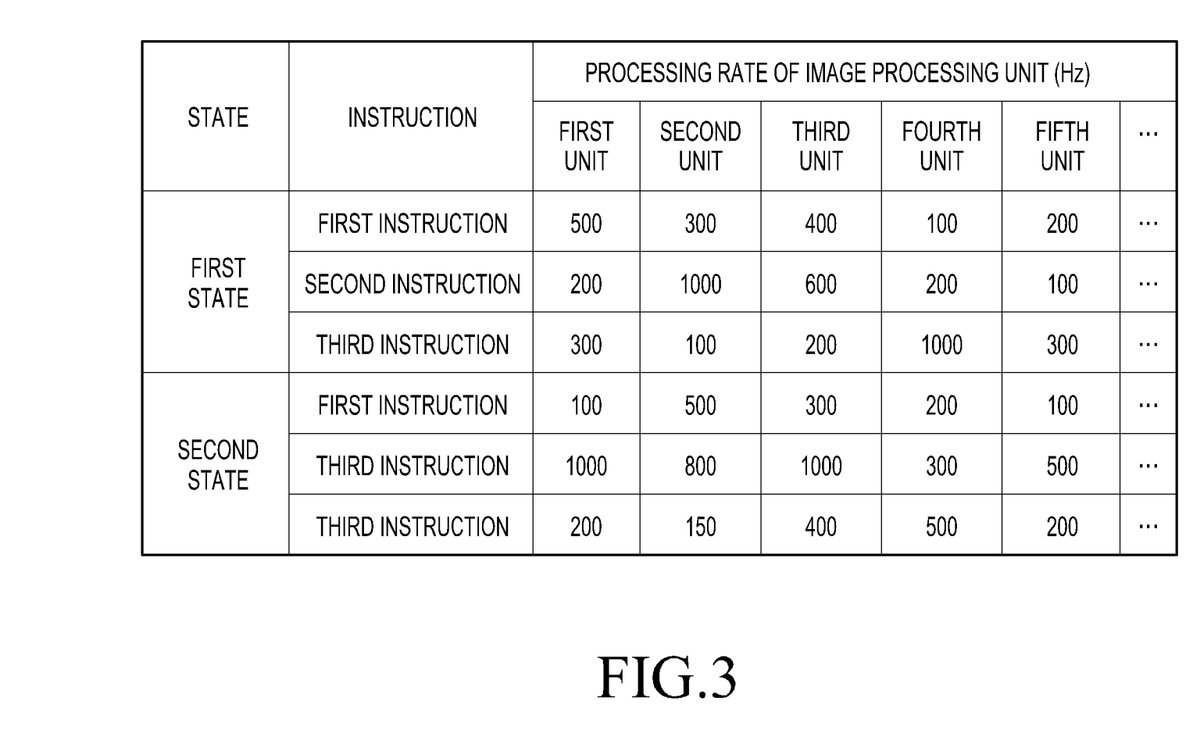
FIG. 3 illustrates a distribution table according to an embodiment of the present disclosure.

FIG. 3 illustrates a distribution table according to an embodiment of the present disclosure.

Referring to FIG. 3, the distribution table may include respective processing capabilities of image processing units based on states of the electronic device 101 and instructions. Such information of respective processing capabilities of image processing units may depend on an amount of remaining charge of the battery, an extent of heating, an amount of memory use of each image processing unit or respective clocks of the image processing units.

For example, the distribution table may include respective processing speeds of image processing units for executing first, second and third instructions under each of first and second states.

Upon reception of the second instruction for executing an input image under the first state of the electronic device 101, the manager module 210 may extract image processing parameters for at least one image processing unit that may execute the second instruction under the first state from the distribution table. The manager module 210 may then select a second unit that may execute the second instruction most quickly based on the extracted image processing parameters. The manager module 210 may then send the input image for the second unit to process the input image.

Upon reception of the third instruction for executing an input image under the second state of the electronic device 101, the manager module 210 may extract image processing parameters for at least one image processing unit that may execute the third instruction under the second state from the distribution table. The manager module 210 may then select third and fourth units that may execute the third instruction most quickly based on the extracted image processing parameters. Then, the manager module 210 may divide the input image and distribute the divided input image for the third and fourth units to process them.

To sum up, in various embodiments of the present disclosure, the electronic device 101 may include an image processing module having at least one image processing unit for performing image processing; a manager module for determining at least one image processing unit for executing a received instruction to process an input image based on a state of the electronic device 101, dividing the input image and distributing the divided input images to the determined at least one image processing unit, and processing the divided images using the at least one image processing unit and combining the processed divided images; and a distribution table creation module for creating a distribution table used to determine the at least one image processing unit.

Figure 4:
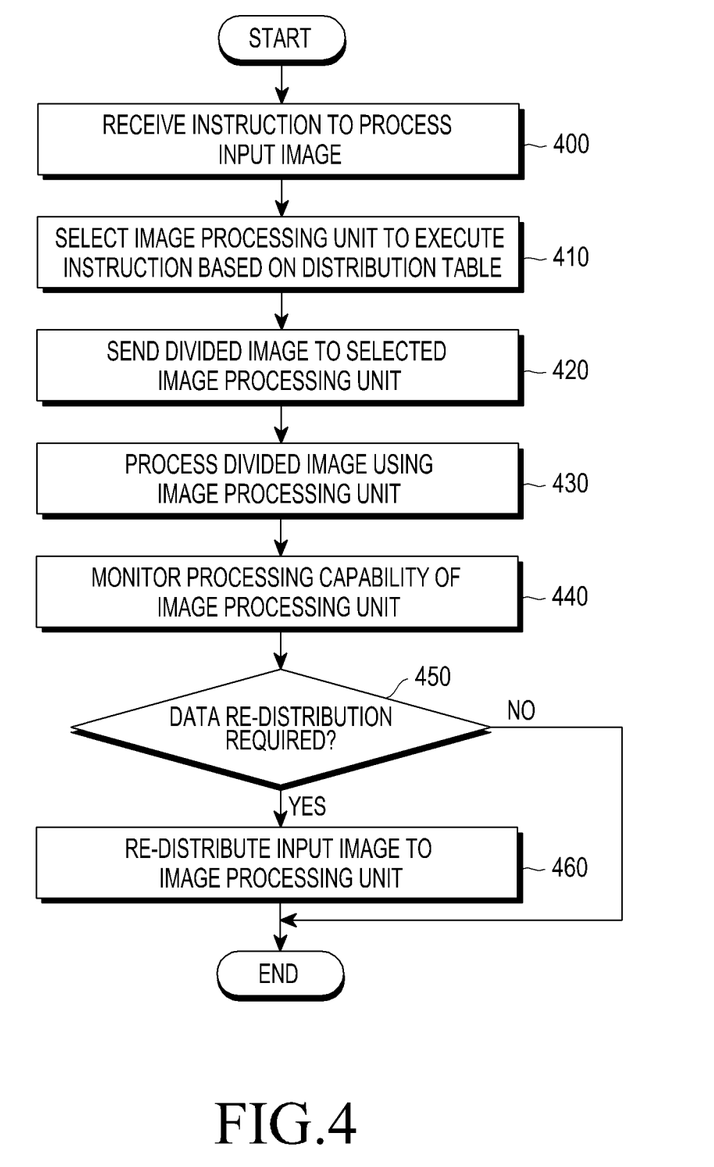
FIG. 4 is a flowchart illustrating operations of processing an input image according to an embodiment of the present disclosure.

FIG. 4 is a flowchart illustrating operations of processing an input image according to an embodiment of the present disclosure.

In operation 400, the manager module 210 may receive an instruction to perform image processing on an input image.

In operation 410, the manager module 210 may select at least one image processing unit for executing the instruction based on a pre-stored distribution table.

For example, if the instruction is to apply a blur effect on the input image, the manager module 210 may select at least one image processing unit for performing image processing in response to the instruction in the current state of the electronic device 101 based on the pre-stored distribution table.

In operation 420, the manager module 210 may divide the input image and send the divided image to the selected at least one image processing unit.

In operation 430, the manager module 210 may process the divided image using the at least one image processing unit, and output a final image by combining the divided images in an order of completing image processing on the divided images.

In operation 440, the manager module 210 may monitor respective processing capabilities of input processing units. The image processing units may have processing capabilities changed according to a feature and current state of the electronic device 101.

In operation 450, the manager module 210 may determine whether data re-distribution for image processing units is required. If the data re-distribution is required, the manager module 210 proceeds to operation 460, and otherwise, if the data re-distribution is not required, the manager module 210 ends the image processing operation.

In operation 460, the manager module 210 may re-distribute the input image to the image processing units. The manager module 210 may periodically monitor the image processing state of the image processing unit and re-distribute the data for the image processing units. For example, the manager module 210 may monitor respective processing capabilities of the image processing units, and determine whether data re-distribution is required for image processing. If the data re-distribution is required, the manager module 210 may perform data re-distribution for image processing units. In an embodiment, the manager module 210 may monitor the image processing capabilities of the at least one image processing unit and accordingly re-distribute data for an image processing unit having degraded image processing capability to another image processing unit or re-distribute less amount of data to the image processing unit having the degraded processing capability.

To sum up, in various embodiments of the present disclosure, an image processing method may include receiving an instruction to process an input image; determining at least one image processing unit to be used to execute the instruction based on a state of the electronic device 101; dividing the input image and distribute the divided input image to the determined at least one image processing unit; and processing the divided image using the at least one image processing unit and combining the processed divided image.

Figure 5:
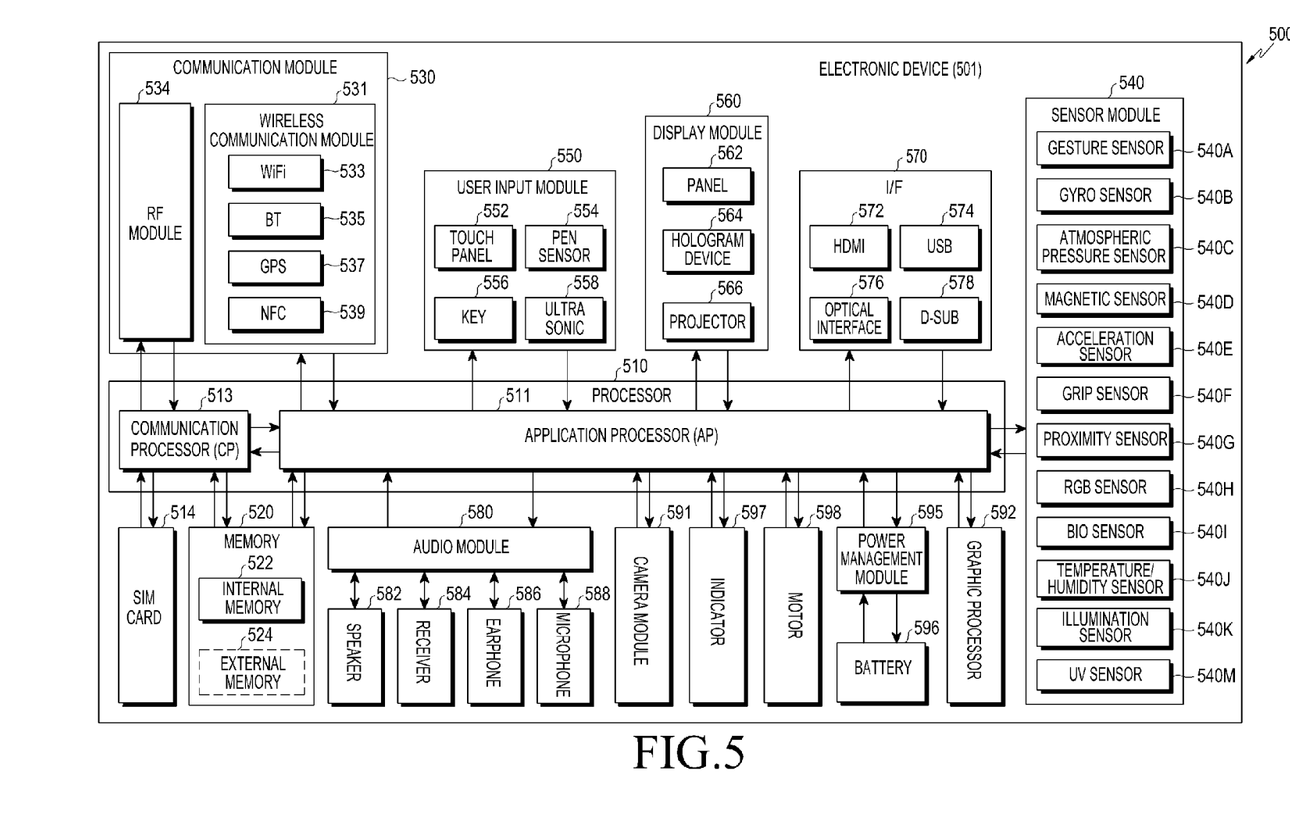
FIG. 5 is a block diagram of an electronic device according to an embodiment of the present disclosure.

FIG. 5 is a block diagram of an electronic device according to an embodiment of the present disclosure.

In the block diagram 500, the electronic device 501 may constitute the entire or some of the electronic device 101 shown in FIG. 1.

Referring to FIG. 5, the electronic device 501 may include one or more processors 510, a communication module 530, a Subscriber Identification Module (SIM) card 514, a memory 520, a sensor module 540, a user input module 550, a display module 560, an interface 570, an audio module 580, a camera module 591, a graphic processor 592, a power manager module 595, a battery 596, an indicator 597, and a motor 598.

The processors 510 may include an Application Processor (AP) 511 which may control hardware and software components connected to the AP 511 by running an operating system or application programs, and perform data processing and operation. The AP 511 may be implemented in e.g., a System on Chip (SoC). In accordance with an embodiment, the AP 511 may further include a Graphic Processing Unit (GPU).

The communication module 530 (corresponding to the communication interface 160 as shown in FIG. 1) may communicate data with other electronic devices, such as the external electronic device 104 and the server 106 connected via a network. In accordance with an embodiment, the communication module 530 may include a cellular or wireless communication module 531 and an RF module 534. The wireless communication module 531 includes a Wi-Fi module 533, a BT module 535, a GPS module 537, and an NFC module 539.

The wireless communication module 531 may provide voice calls, video calls, SMS or Internet services over a communication network, such as LTE, LTE-A, CDMA, WCDMA, UMTS, WiBro, GSM, etc. The wireless communication module 531 may also identify and authenticate an electronic device in the communication network in cooperation with the SIM card 514. In accordance with an embodiment, the cellular module 531 may perform at least a part of functions that the AP 511 may provide. For example, the cellular module 531 may perform at least a part of multimedia control function.

In an embodiment, the processor 510 may include a Communication Processor (CP) 513. The cellular module 531 may also be implemented in e.g., a SoC. While the components of FIG. 5, such as the cellular module 531 (e.g., a CP), the memory 530 or the power manager module 595 are illustrated as being separate from the AP 511, the AP 511 may incorporate some of the aforementioned components (e.g., the cellular module 531) in other embodiments.

In accordance with an embodiment, the AP 511 or the CP513 may load a command or data received from at least one of a non-volatile memory or other components connected to the AP 510 or the CP 513, and then process the command or data. In addition, the AP 510 or the CP 513 may store data received from at least one of the other components or generated by at least one of the other components in a non-volatile memory.

The Wi-Fi module 533, the BT module 535, the GPS module 537, and the NFC module 539 may each include a processor for processing data sent or received through the corresponding module. While FIG. 5 illustrates each of the Wi-Fi module 533, the BT module 535, the GPS module 537, and the NFC module 539 as a separate block, some of them (e.g., two or more of them) may be incorporated in a single Integrated Chip (IC) or an IC package in other embodiments. For example, at least some of processors corresponding to the Wi-Fi module 533, the BT module 535, the GPS module 537, and the NFC module 539, may be implemented in a single SoC.

The RF module 534 may perform data communication, more specifically RF signal communication. The RF module 534 may include e.g., a transceiver, a Power Amp Module (PAM), a frequency filter, or a Low Noise Amplifier (LAN) (not shown). The RF module 534 may further include some parts for wireless communication, i.e., for transmitting or receiving RF signals over the air, such as conductors, wires, etc. While FIG. 5 illustrates that the Wi-Fi module 533, the BT module 535, the GPS module 537, and the NFC module 539 share the wireless communication module 531, at least one of them may perform RF signal communication through a separate RF module.

The SIM card 514 may include a subscriber identification module, and may be inserted into a slot formed in a particular position in the electronic device.

The SIM card 514 may include a unique identification information, such as Integrated Circuit Card Identifier (IC-CID), or subscriber information, such as International Mobile Subscriber Identity (IMSI).

The memory 520 (corresponding to the memory 130 of FIG. 1) may include an internal memory 522 or an external memory 524. The internal memory 522 may include e.g., at least one of a volatile memory, such as Dynamic Random Access Memory (DRAM), Static RAM (SRAM), Synchronous Dynamic RAM (SDRAM), or the like, or a non-volatile memory, such as One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, Nor flash memory, or the like.

In an embodiment, the internal memory 522 may be a Solid State Drive (SSD). The external memory 524 may include a flash drive, such as compact flash (CF), Secure Digital (SD), Micro Secure Digital (Micro-SD), Mini Secure Digital (Mini-SD), Extreme Digital (xD), memory stick, or the like. The external memory 524 may be operationally connected to the electronic device 501 through various interfaces. In an embodiment, the electronic device 501 may further include a storage device (or a storage medium), such as a hard drive.

The sensor module 540 may measure a physical quantity or convert information measured or detected by monitoring the electronic device 501 to an electric signal. The sensor module 540 may include at least one of a gesture sensor 540A, a gyro sensor 540B, an atmospheric pressure sensor 540C, a magnetic sensor 540D, an acceleration sensor 540E, a grip sensor 540F, a proximity sensor 540G, a color sensor 540H such as an RGB (Red, Green, Blue) sensor, a bio sensor 540I, a temperature/humidity sensor 540J, an illumination sensor 540K, or an Ultra Violet (UV) sensor 540M. Additionally or alternatively, the sensor module 540 may include an E-nose sensor, an Electromyography (EMG) sensor, an Electroencephalogram (EEG) sensor, an Electrocardiogram (ECG) sensor, an Infrared (IR) sensor, an iris sensor, a finger print sensor, or the like. The sensor module 540 may further include a control circuit for controlling at least one or more of the sensors included in the sensor module 540.

The input device or user input module 550 may include a touch panel 552, a (digital) pen sensor 554, a key 556, or an ultrasonic input device 558. The touch panel 552 may recognize touch inputs in at least one of capacitive, resistive, infrared, or ultrasonic methods. The touch panel 552 may further include a control circuit.

With the resistive method, physical contact or proximity detection may be possible. The touch panel 552 may further include a tactile layer. In this regard, the touch panel 552 may provide the user with a tactile response.

The (digital) pen sensor 554 may be implemented in a way identical or similar to e.g., how a touch input of a user is received, or by using a separate sheet for recognition. The key 556 may include e.g., a physical button, optical key or key pad. The ultrasonic input device 558 may use an input tool that generates an ultrasonic signal and enable the electronic device 501 to determine data by sensing the ultrasonic signal to the microphone 588, thereby enabling wireless recognition. In an embodiment, the electronic device 501 may receive a user input from an external device, such as a computer or a server through the communication module 530.

The display module 560 (corresponding to the display 150 of FIG. 1) may include a panel 562, a hologram device 564, or a projector 566. The panel 562 may be, e.g., a Liquid Crystal Display (LCD), Active Matrix Organic Light Emitting Diodes (AMOLEDs), or the like. The panel 562 may be implemented to be flexible, transparent, or wearable. The panel 562 may also be incorporated with the touch panel 552 in a unit. The hologram device 564 may make three dimensional (3D) images (holograms) in the air by using light interference. The projector 566 may display an image by projecting light onto a screen. The screen may be, for example, located inside or outside of the electronic device 501. In accordance with an embodiment, the display 560 may further include a control circuit to control the panel 562, the hologram device 564, or the projector 566.

The interface 570 may include e.g., a HDMI 572, a USB 574, an optical interface 576, or a D-subminiature (D-sub) 578. The interface 570 may be included in e.g., the communication interface 160 shown in FIG. 1. Additionally or alternatively, the interface 570 may include a Mobile High-definition Link (MHL) interface, a SD card/multimedia card (MMC) interface, or IrDA standard interface.

The audio module 580 may convert a sound to an electric signal or vice versa. At least a part of the audio module 580 may be included in e.g., the I/O interface 140 as shown in FIG. 1. The audio module 580 may process sound information input or output through e.g., a speaker 582, a receiver 584, an earphone 586, or a microphone 588.

The camera module 591 may be a device for capturing still images and videos, and may include, in an embodiment, one or more image sensors (e.g., front and back sensors), a lens, an Image Signal Processor (ISP), or a flash such as an LED or xenon lamp.

The graphic processor 592 may perform single or parallel image processing on an input image in response to an instruction for image processing.

The power manager module 595 may manage power of the electronic device 501. Although not shown, e.g., a Power Management Integrated Circuit (PMIC), a charger IC, or a battery or fuel gauge is included in the power manager module 595.

The PMIC may be mounted on e.g., an IC or an SOC. A charging method may be divided into wired and wireless charging methods. The charger IC may charge a battery and prevent overvoltage or overcurrent from being induced from a charger. In an embodiment, the charger IC may be used in at least one of a cable charging scheme and a wireless charging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging.

The battery gauge may measure an amount of remaining power of the battery 596, a voltage, a current, or a temperature while the battery 596 is being charged. The battery 596 may save or generate electricity, and supply power to the electronic device with the saved or generated electricity. The battery 596 may include, e.g., a rechargeable battery or a solar battery.

The indicator 597 may indicate a particular state of the electronic device 501 or a part of the electronic device (e.g., the AP 510), the particular state including e.g., a booting state, a message state, or charging state. The motor 598 may convert electric signals to mechanical vibration. Although not shown, a processing unit for supporting mobile TV, such as a GPU may be included in the electronic device 501. The processing unit for supporting mobile TV may process media data conforming to a standard for Digital Multimedia Broadcasting (DMB), Digital Video Broadcasting (DVB), or media flow.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

At least a part of the device (e.g., modules or their functions) or method (e.g., operations) may be implemented as instructions stored in a computer-readable storage medium e.g., in the form of a programming module. The instructions, when executed by one or more processor (e.g., the processor 210), may cause the processor to carry out a corresponding function. The computer-readable storage medium may be e.g., the memory 220. At least a part of the programming module may be implemented by e.g., the processor 210. At least a part of the programming module may include e.g., a module, program, routine, set of instructions, process, or the like for performing one or more functions.

The computer-readable storage medium may include a hardware device configured to store and perform program instructions (e.g., programming module), such as magnetic media such as hard discs, floppy discs, and magnetic tapes, optical media such as Compact Disc ROMs (CD-ROMs) and Digital Versatile Discs (DVDs), magneto-optical media such as floptical disks, ROMs, RAMs, Flash Memories, and/or the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

In accordance with various embodiments, provided is a storage medium having instructions stored thereon, the instructions, when executed by at least one processor, causing the at least one processor to perform at least one operation including: receiving an instruction to process an input image; determining at least one image processing unit to be used to execute the instruction based on a state of an electronic device; dividing the input image and distribute the divided image to the determined at least one image processing unit; and processing the divided image using the at least one image processing unit and combining the processed divided image.

According to the embodiments of the present disclosure, by enabling at least one image processing unit to perform optimized image processing based on various states of an electronic device, power consumption of the electronic device may be reduced and image processing speed may increase.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An image processing method comprising:
   receiving an instruction to process an input image;
   identifying image processing capability information of a plurality of image processor according to a type of the received instruction and a state of an electronic device;
   selecting at least one image processor from among the plurality of image processors based on the image processing capability information of the plurality of image processor;
   determining amount of data which can be processed by each of the at least one image processor based on the image processing capability information;
   dividing the input image into a plurality of image pieces and distributing each of the plurality of image pieces to the at least one image processor based on the determined amount of the data;
   processing each of the plurality of image pieces using the at least one image processor;
   monitoring the state of the electronic device;
   when a first image processing capability of the at least one image processor is changed in response to a change in the state of the electronic device, adjusting the amount of the data for each of the at least one image processor; and
   combining the plurality of the processed image pieces,
   wherein the state of the electronic device depends on at least one of an amount of remaining charge of a battery, an extent of heating, and an amount of memory use.

2. The image processing method of claim 1, wherein the selecting of the at least one image processor comprises:

extracting image processing parameters for executing the instruction based on the state of the electronic device from a distribution table used to determine the at least one image processor; and
   selecting the at least one image processor based on the extracted image processing parameters.

3. The image processing method of claim 2, wherein the distribution table includes respective image processing capability information of the at least one image processor able to execute at least one instruction based on at least one state of the electronic device.

4. The image processing method of claim 2, wherein the image processing parameters include respective image processing capability information of the at least one image processor able to execute the instruction based on the state of the electronic device from the distribution table.

5. The image processing method of claim 2, further comprising:
   periodically updating the distribution table based on the state of the electronic device.

6. The image processing method of claim 1, further comprising:
   when respective image processing speed of the at least one image processor is slower than a predetermined speed threshold, re-distributing the plurality of image pieces for the at least one image processor.

7. An electronic device comprising:
   a plurality of image processors configured to perform image processing; and
   a processor configured to:
      in response to reception of the instruction to process an input image, identify image processing capability information of the plurality of image processor according to a type of the instruction and a state of the electronic device;
      select at least one image processor, from among the plurality of image processors, the image processing capability information;
      determine amount of data which can be processed by each of the at least one image processor based on the image processing capability information;
      divide the input image into a plurality of image pieces;
      distribute each of the plurality of image pieces to the at least one image processor based on the determined amount of the data;
      process each of the plurality of image pieces using the at least one image processor;
      monitor the state of the electronic device;
      when a first image processing capability of the at least one image processor is changed in response to a change in the state of the electronic device, adjust the amount of the data for each of the at least one image processor; and
      combine the plurality of the processed image pieces;
      wherein the state of the electronic device depends on at least one of an amount of remaining charge of the battery, an extent of heating, and an amount of memory use.

8. The electronic device of claim 7, wherein the processor is further configured to:
   create a distribution table used to determine the at least one image processor.

9. The electronic device of claim 8, wherein the distribution table includes respective image processing capability information of the at least one image processor able to execute at least one instruction based on the state of the electronic device.

10. The electronic device of claim 9, wherein the processor is further configured to:
   extract image processing parameters for executing the instruction based on the state of the electronic device from the distribution table, and
   select the at least one image processor based on the extracted image processing parameters.

11. The electronic device of claim 10, wherein the image processing parameters include respective image processing capability information of the at least one image processor able to execute the instruction based on the state of the electronic device from the distribution table.

12. The electronic device of claim 8, wherein the processor is further configured to periodically update the distribution table based on the state of the electronic device.

13. The electronic device of claim 7, wherein the processor is further configured to determine if respective image processing speed of the at least one image processor is slower than a predetermined speed threshold.

14. The electronic device of claim 7, wherein the processor is configured to control a monitor device.

15. The electronic device of claim 14, wherein the processor uses a distribution table to extract image processing parameters for executing the instruction based on the state of the electronic device.

16. The electronic device of claim 15, wherein the processor is configured to:
   determine the at least one image processor for processing the input image based on the extracted image processing parameters, and
   divide the input image and send the divided input image to the at least one image processor.

17. A non-transitory computer-readable recording medium having recorder thereon at least one program comprising commands, which when executed by a computer, performs a method, the method comprising:
   receiving an instruction to process an input image;
   identifying image processing capability information of a plurality of image processor according to a type of the received instruction and a state of an electronic device;
   selecting at least one image processor from among the plurality of image processors based on the image processing capability information;
   determining amount of data which can be processed by each of the at least one image processor based on the image processing capability information;
   dividing the input image into a plurality of image pieces and distributing each of the plurality of image pieces to the at least one image processor based on the determined amount of the data;
   processing each of the plurality of image pieces using the at least one image processor;
   monitoring the state of the electronic device;
   when a first image processing capability of the at least one image processor is changed in response to a change in the state of the electronic device, adjusting the amount of the data for each of the at least one image processor; and
   combining the plurality of the processed image pieces,
   wherein the state of the electronic device depends on at least one of an amount of remaining charge of a battery, an extent of heating, and an amount of memory use.

* * * * *